US011363042B2

(12) United States Patent
Kessel et al.

(10) Patent No.: US 11,363,042 B2
(45) Date of Patent: Jun. 14, 2022

(54) DETECTION OF ANOMALIES IN COMMUNITIES BASED ON ACCESS PATTERNS BY USERS

(71) Applicant: NETAPP, INC., Sunnyvale, CA (US)

(72) Inventors: Omri Kessel, Waban, MA (US); Shailaja Kamila, Bangalore (IN); Pratyush Uppuluri, Bangalore (IN); Jayanta Basak, Bangalore (IN)

(73) Assignee: NETAPP, INC., San Jose, CA (US)

( * ) Notice: Subject to any disclaimer, the term of this patent is extended or adjusted under 35 U.S.C. 154(b) by 322 days.

(21) Appl. No.: 16/297,513

(22) Filed: Mar. 8, 2019

(65) Prior Publication Data

US 2020/0236123 A1     Jul. 23, 2020

(30) Foreign Application Priority Data

Jan. 21, 2019    (IN) .............................. 201941002420

(51) Int. Cl.
*H04L 9/40*          (2022.01)

(52) U.S. Cl.
CPC ...... *H04L 63/1425* (2013.01); *H04L 63/1416* (2013.01)

(58) Field of Classification Search
CPC ............. H04L 63/1425; H04L 63/1416; H04L 67/1097
USPC ......................................................... 726/23
See application file for complete search history.

(56) References Cited

U.S. PATENT DOCUMENTS

| 8,745,759 | B2 * | 6/2014 | Halas | G06F 21/316 |
| | | | | 726/30 |
| 9,166,993 | B1 * | 10/2015 | Liu | H04L 63/1425 |
| 10,003,608 | B2 * | 6/2018 | Treat | H04L 63/0227 |
| 10,681,060 | B2 * | 6/2020 | Scheidler | G06F 21/566 |
| 10,686,816 | B1 * | 6/2020 | Shintre | H04L 63/1441 |
| 2012/0047575 | A1 * | 2/2012 | Baikalov | G06F 21/604 |
| | | | | 726/21 |
| 2016/0142435 | A1 * | 5/2016 | Bernstein | H04L 63/1441 |
| | | | | 726/23 |
| 2016/0149941 | A1 * | 5/2016 | Thakur | H04L 63/1425 |
| | | | | 726/23 |
| 2016/0191560 | A1 * | 6/2016 | Pegna | G06F 21/552 |
| | | | | 726/23 |
| 2016/0197948 | A1 * | 7/2016 | Im | H04L 63/1425 |
| | | | | 726/23 |
| 2016/0241576 | A1 * | 8/2016 | Rathod | H04L 63/1425 |
| 2016/0323295 | A1 * | 11/2016 | Joram | G06F 21/566 |
| 2017/0061123 | A1 * | 3/2017 | Parker-Wood | G06F 21/552 |
| 2017/0201531 | A1 * | 7/2017 | Kim | H04L 63/1466 |
| 2018/0359270 | A1 * | 12/2018 | Chari | H04L 63/1425 |

(Continued)

*Primary Examiner* — Badri Narayanan Champakesan
(74) *Attorney, Agent, or Firm* — Haynes and Boone, LLP (57) ABSTRACT

A system, method, and machine-readable storage medium for detecting an anomaly are provided. In some embodiments, the method includes computing an access rate of a set of entities for each user of a plurality of users. The access rate may refer to data operations for the set of entities stored by a storage system. The method also includes normalizing the access rates for a subset of the plurality of users, the subset belonging to a community. The method further includes determining whether a normalized access rate from among the access rates satisfies a threshold. The method also includes detecting an anomaly in response to a determination that the normalized access rate satisfies the threshold.

20 Claims, 4 Drawing Sheets

(56) References Cited

U.S. PATENT DOCUMENTS

| | | | |
|---|---|---|---|
| 2018/0359272 A1* | 12/2018 | Mizrachi | G06F 21/57 |
| 2019/0028489 A1* | 1/2019 | Wang | H04L 63/1425 |
| 2019/0087572 A1* | 3/2019 | Ellam | G06F 21/554 |
| 2019/0102696 A1* | 4/2019 | Guidotti | G06F 40/103 |
| 2020/0120375 A1* | 4/2020 | Hamon | H04N 21/234345 |

* cited by examiner

DETECTION OF ANOMALIES IN COMMUNITIES BASED ON ACCESS PATTERNS BY USERS

CROSS REFERENCE TO RELATED APPLICATIONS

The present application claims priority to and the benefit of the India Patent Application No. 201941002420 filed Jan. 21, 2019 which is hereby incorporated by reference in its entirety as if fully set forth below and for all applicable purposes.

TECHNICAL FIELD

The present description relates to detecting anomalies in user access patterns, and more specifically, to a system, method, and machine-readable storage medium for detecting anomalies in communities based on user access patterns of entities stored in a distributed storage system for, e.g., cost savings, data security, and/or cost management.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Improvements in distributed storage have given rise to a cycle where applications demand increasing amounts of data delivered with reduced latency, greater reliability, and greater throughput.

Operational teams across enterprise organizations face the challenge of handling data that is ever increasing in size and spread across a mix of on-premise and cloud-based data sources and ensuring that their data is secure. For understanding complex systems with large amounts of data and users, communities may be formed. Historically, a community has corresponded to groups of nodes in a graph (e.g., network depicted as graph), e.g., a set of nodes that is more densely connected to each other than the rest of the network nodes. A popular use of communities is a social network in which users connect with each other, and community extraction in social networks results in connected subgraphs (e.g., social circles).

Individual user accesses of data in a complex system, when measured against the user's own individual history, may result in spurious detections of suspicious access. Further, it may be difficult to differentiate between abnormal behavior that is legitimate and abnormal behavior that should be flagged as suspicious, possibly resulting in a high number of false alarms.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, particular features described in relation to one aspect or embodiment may be applied to other disclosed aspects or embodiments of the disclosure, even though not specifically shown in the drawings or described in the text.

Operational teams across enterprise organizations face the challenges of handling a vast amount of data stored in different data storage centers and spread across a mix of on-premise and cloud-based data sources. The amount of data stored and handled by enterprise organizations continues to grow. An enterprise organization may have many departments, with users in the same departments typically accessing the same files as each other. For example, employees in the Human Resources (HR) department tend to access the same files as each other. In another example, engineers working on the same project tend to access the same files as each other.

An entity represents any arbitrary unit of data regardless of whether it is organized as an object, a file, a directory, or a set of blocks. It may be desirable to track and identify usage patterns of users to detect anomalies based on membership in communities. A community may be defined as including a set of users (e.g., in an organization) who have accessed a common set of entities (e.g., files, directories, objects, etc. according to embodiments of the present disclosure) over a defined time-period.

In an example, a community detection system may form communities by detecting and generating communities of users based on a common set of entities stored in a distributed storage system for, e.g., cost savings, data security, and/or cost management. After one or more communities are formed, a system may consider the community to which a user belongs as a baseline that provides insight into other users' activities (e.g., for use in detection anomalous use). For example, if a user belonging to a community has increased her access rates for a given set of files and other users belonging to the same community have also increased their access rates for the given set of files, it may be determined that the user's behavior is not suspicious, given the access rates of other users in the community.

If, however, only the user's access increases without a proportional increase in other users' access rates, the user's behavior may be flagged as suspicious. By using communities in such a way, the individual user's behavior may more accurately be put in context relative to other users in the same community. In other words, each individual user may have varied access rates (e.g., high, low, or medium, etc.), but as the collective behavior of a community (that a given user is a part of) changes (e.g., all users in the community have increased their access rates), it may be determined that the behavior is not suspicious behavior.

In some examples, an anomaly detection system may compute an access rate of a set of entities for each user of a plurality of users. The access rate refers to data operations for the set of entities stored by a storage system. Additionally, the access rates may be determined with respect to a sliding time period. The data operations may include a read or write operation. The anomaly detection system may normalize the access rates for a subset of the plurality of users, where the subset of users belongs to a community. Individual user accesses of one or more entities stored in the storage system, measured against the user's own individual history, may result in spurious detections of suspicious access. Accordingly, it may be desirable to normalize access rates for the subset of users belonging to the community. The community may be based on access to the set of entities by the subset of users. The anomaly detection system may normalize the access rates by dividing a respective user's access rate of the subset of users by a total access rate of the community.

The anomaly detection system may determine whether a normalized access rate from among the access rates satisfies a threshold. The normalized access rate is associated with a particular user's access rate of the set of entities. The anomaly detection system may detect an anomaly in response to a determination that the normalized access rate satisfies the threshold. In an example, if the normalized access rate satisfies or exceeds the threshold, the particular user may be associated with suspicious behavior. In this example, if the normalized access rate does not satisfy the threshold, the particular user may not be associated with suspicious behavior. If an anomaly is detected, the anomaly detection system may transmit a message to an administrator, with the message specifying a user's entity access patterns associated with the anomaly. Additionally, or alternatively, the anomaly detection system may use other factors for detecting an anomaly (e.g., a size of a community, a user membership of the community, etc.).

Figure 1:
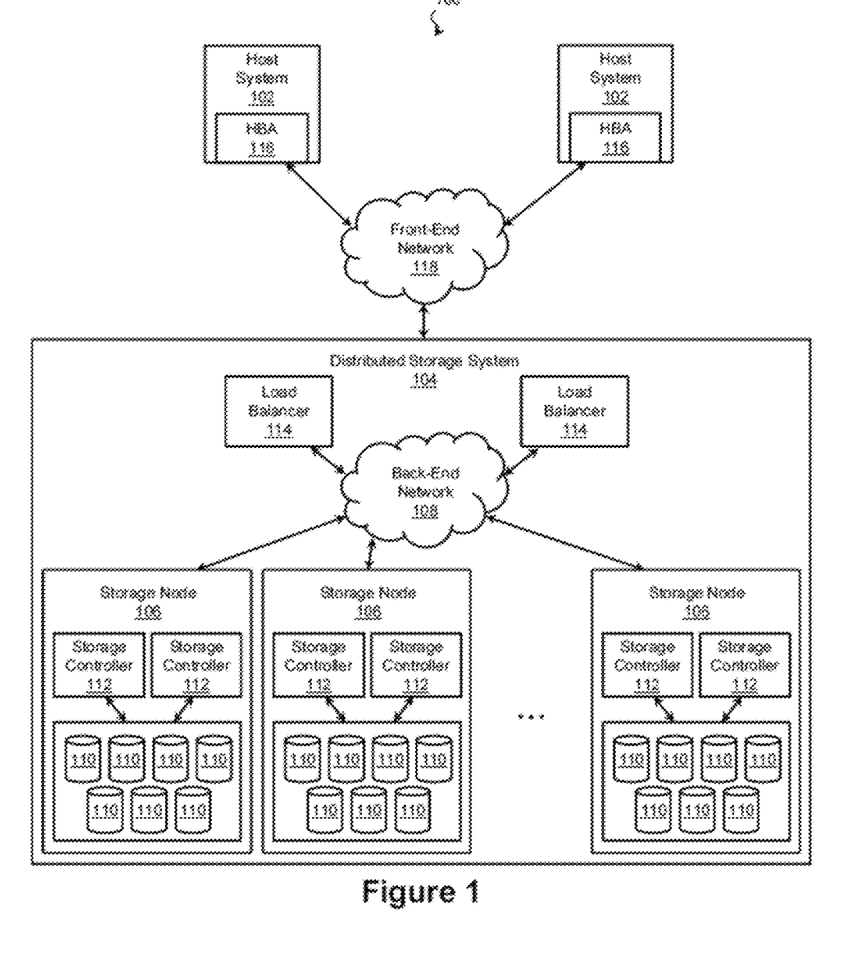
FIG. 1 is a schematic diagram of a computing architecture according to aspects of the present disclosure.

FIG. 1 is a schematic diagram of a computing architecture 100 according to aspects of the present disclosure. The computing architecture 100 includes one or more host systems 102 (hosts), each of which may interface with a distributed storage system 104 to store and manipulate data. The distributed storage system 104 may use any suitable architecture and protocol. For example, in some embodiments, the distributed storage system 104 is a StorageGRID system, an OpenStack Swift system, a Ceph system, or other suitable system. The distributed storage system 104 includes one or more storage nodes 106 over which the data is distributed. The storage nodes 106 are coupled via a back-end network 108, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some exemplary embodiments, the storage nodes 106 are coupled by a TCP/IP back-end network 108, which is local to a rack or datacenter, although additionally or in the alternative, the network 108 may extend between sites in a WAN configuration or be a virtual network extending throughout a cloud. The storage nodes 106 may be as physically close or as widely dispersed as the application may warrant. In some examples, the storage nodes 106 are housed in the same racks. In other examples, storage nodes 106 are located in different facilities at different sites anywhere in the world. The node arrangement may be determined based on cost, fault tolerance, network infrastructure, geography of the hosts, and other considerations.

In the illustrated embodiment, the computing architecture 100 includes a plurality of storage nodes 106 in communication with a plurality of hosts 102. It is understood that for clarity and ease of explanation, only limited number of storage nodes 106 and hosts 102 are illustrated, although the computing architecture 100 may include any number of hosts 102 in communication with a distributed storage system 104 containing any number of storage nodes 106. An exemplary storage system 104 receives data transactions (e.g., requests to read and/or write data) from the hosts 102 and takes an action such as reading, writing, or otherwise accessing the requested data so that storage devices 110 of the storage nodes 106 appear to be directly connected (local) to the hosts 102. This allows an application running on a host 102 to issue transactions directed to the data of the distributed storage system 104 and thereby access this data as easily as it can access data on storage devices local to the host 102. In that regard, the storage devices 110 of the distributed storage system 104 and the hosts 102 may include hard disk drives (HDDs), solid state drives (SSDs), storage class memory (SCM), RAM drives, optical drives, and/or any other suitable volatile or non-volatile data storage medium. Further, one or more of the storage nodes 106 may be connected to one or more cloud storage providers according to embodiments of the present disclosure, and likewise appear to be directly connected (local) to the hosts 102.

With respect to the storage nodes 106, an exemplary storage node 106 contains any number of storage devices 110 in communication with one or more storage controllers 112. The storage controllers 112 exercise low-level control over the storage devices 110 in order to execute (perform) data transactions on behalf of the hosts 102, and in so doing, may group the storage devices for speed and/or redundancy using a protocol such as RAID (Redundant Array of Independent/Inexpensive Disks). The grouping protocol may also provide virtualization of the grouped storage devices 110. Virtualization includes mapping physical addresses of the storage devices into a virtual address space and presenting the virtual address space to the hosts 102, other storage nodes 106, and other requestors. In this way, the storage node 106 represents the group of devices as a single device, often referred to as a volume. Thus, a requestor can access data within a volume without concern for how it is distributed among the underlying storage devices 110.

Further, an exemplary storage node 106 may be connected to one or more cloud storage providers of varying levels (e.g., standard cloud storage or lower-class cloud storage, or both, for example S3 or GLACIER storage classes). The cloud storage node 106 may exercise protocol-level control over the allocated cloud storage space available to it on behalf of the hosts 102. Such control may be via one or more protocols such as HTTP, HTTPS, etc.

In addition to storage nodes, the distributed storage system 104 may include ancillary systems or devices (e.g., load balancers 114). For example, in some embodiments, a host 102 may initiate a data transaction by providing the transaction to a load balancer 114. The load balancer 114 selects one or more storage nodes 106 to service the transaction. When more than one alternative is possible, the load balancer 114 may select a particular storage node 106 based on any suitable criteria including storage node load, storage node capacity, storage node health, network quality of service factors, and/or other suitable criteria. Upon selecting the storage node(s) 106 to service the transaction, the load balancer 114 may respond to the host 102 with a list of the storage nodes 106 or may forward the data transaction to the storage nodes 106. Additionally, or in the alternative, a host 102 may initiate a data transaction by contacting one or more of the storage nodes 106 directly rather than contacting the load balancer 114.

Turning now to the hosts 102, a host 102 includes any computing resource that is operable to exchange data with the distributed storage system 104 by providing (initiating) data transactions to the distributed storage system 104. In an exemplary embodiment, a host 102 includes a host bus adapter (HBA) 116 in communication with the distributed storage system 104. The HBA 116 provides an interface for communicating, and in that regard, may conform to any suitable hardware and/or software protocol. In various embodiments, the HBAs 116 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In many embodiments, the host HBAs 116 are coupled to the distributed storage system 104 via a front-end network 118, which may include any number of wired and/or wireless networks such as a LAN, an Ethernet subnet, a PCI or PCIe subnet, a switched PCIe subnet, a WAN, a MAN, the Internet, or the like. To interact with (e.g., read, write, modify, etc.) remote data, the HBA 116 of a host 102 sends one or more data transactions to the load balancer 114 or to a storage node 106 directly via the front-end network 118. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

While the load balancers 114, storage nodes 106, and the hosts 102 are referred to as singular entities, a storage node 106 or host 102 may include any number of computing devices and may range from a single computing system to a system cluster of any size. Accordingly, each load balancer 114, storage node 106, and host 102 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

As described above, the storage system 104 may distribute the hosts' data across the storage nodes 106 for performance reasons as well as redundancy. The distributed storage system 104 is an object-based data system. The storage system 104 may be a distributed object store that spans multiple storage nodes 106 and sites. Object-based data systems provide a level of abstraction that allows data of any arbitrary size to be specified by an object identifier. Object-level protocols are similar to file-level protocols in that data is specified via an object identifier that is eventually translated by a computing system into a storage device address. However, objects are more flexible groupings of data and may specify a cluster of data within a file or spread across multiple files. Object-level protocols include CDMI, HTTP, SWIFT, and S3.

An entity represents any arbitrary unit of data regardless of whether it is organized as an object, a file, a directory, or a set of blocks, etc. Entities may be stored in the distributed storage system 104 and accessed by users. To secure the data and/or the operator of the distributed storage system 104, it may be desirable to track the data usage patterns for each user. For example, if a user accesses an entity, this event may be logged in a community detection system. A community may be defined as including a set of users (e.g., in an organization) who have accessed a common set of entities (e.g., files, directories, objects, etc. according to embodiments of the present disclosure) over a defined time-period. Accordingly, users of a community have a set of common attributes (e.g., accessed a common set of entities).

Individual user accesses of one or more entities stored in the distributed storage system 104, measured against the user's own individual history, may result in spurious detections of suspicious access. In a first example, an abnormally high access rate of a given set of files by a user may be a normal scenario (under change circumstances) given the changes that have happened (e.g., need of the project, workload, or any other requirements). In a second example, though, the abnormally high access rate may be abnormal activity that should be flagged as an anomaly. It may be difficult to differentiate between abnormal behavior that is legitimate (e.g., project need) and behavior that should be flagged as suspicious, possibly resulting in a high number of false alarms.

According to embodiments of the present disclosure, an anomaly detector may consider the community to which a user belongs as a baseline or normalization technique that provides insight into other users' activities (e.g., for use in detection anomalous use). Accordingly, if the user above belongs to a community and other users belonging to the same community also increased their access rates for the given set of files, the anomaly detector may determine that the user's behavior is not suspicious, given the access rates of other users in the community. If, however, only the user's access increases without a proportional increase in other users' access rates, the anomaly detector may flag the user's behavior as suspicious. By using communities in such a way, the anomaly detector may more accurately put in context the individual user's behavior relative to other users in the same community. In other words, each individual user may have varied access rates (e.g., high, low, or medium, etc.), but as the collective behavior of a community (that a given user is a part of) changes (e.g., all users in the community have increased their access rates), the anomaly detector may determine that the behavior is not suspicious behavior.

Figure 2:
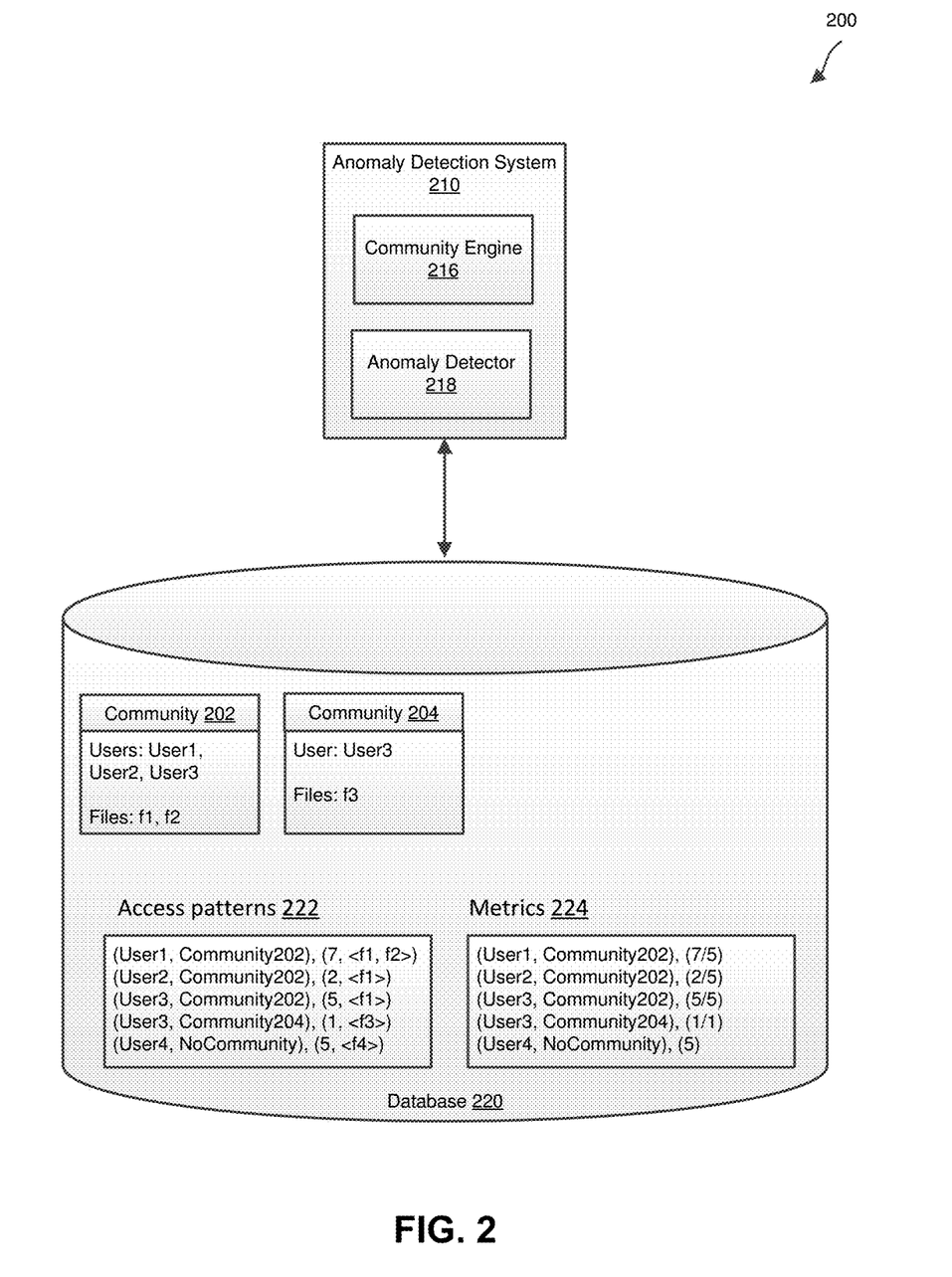
FIG. 2 is a schematic diagram of a computing architecture for detecting anomalies according to aspects of the present disclosure.

FIG. 2 is a schematic diagram of a computing architecture 200 for detecting anomalies according to aspects of the present disclosure. For example, the computing architecture 200 may be, in some examples, implemented as part of the distributed storage system 104. The computing architecture 200 includes an anomaly detection system 210 that protects data from malicious use due, e.g., to insider threats or compromised users (to name just a few examples). In some examples, aspects of the anomaly detection system 210 are incorporated in the storage controllers 112. In some examples, the anomaly detection system 210 may be embodied as a server or other computing system coupled to the back-end network 108 in FIG. 1 and may detect suspicious entity access patterns by the users. The entities may be stored in the storage devices 110 of the storage nodes 106 in FIG. 1 and accessed by the users.

The anomaly detection system 210 includes a community engine 216 and an anomaly detector 218. The community engine 216 may form one or more communities based on a common set of attributes. Examples of the formation and generation of communities are described in India Patent Application No. 201941002412 to Kessel et al., filed Jan. 19, 2019, entitled "Community Generation Based on a Common Set of Attributes," which is incorporated herein by reference in its entirely. This reference discloses examples of formation and generation of communities based on entity access patterns. In an example, a community may be formed by detecting and generating communities of users based on a common set of entities stored in the distributed storage system 104. In an example, a list of entities associated with a plurality of users is obtained, and at least one user of the plurality of users has accessed an entity in the list of entities. Each of the users in a community has accessed each of the entities included in the same community, providing a tight and cohesive relationship between the users and entities included in the same community.

Referring back to the example illustrated in FIG. 2, the community engine 216 may form a community 202 including a set of users {User1, User2, User 3} and a set of files {f1, f2} (i.e., files f1 and f2 are example entities that the users in the set have accessed in the time period) and may form a community 204 including a set of users {User3} and a set of files {f3}.

As time progresses, communities that are formed may be resolved in relation to previous communities. For example, over time, users may access entities, and new communities based on the new accesses may be formed. Accordingly, the number of communities may increase and/or user membership within a community may change. Examples of the resolution of communities are described in India Patent Application No. 201941002499 to Kessel et al., filed Jan. 21, 2019, entitled "Evolution of Communities Derived from Access Patterns," which is incorporated herein by reference in its entirely. This reference discloses examples of resolving candidate communities as being a new stable community or as being part of a matching stable community. The term "candidate community" may refer to a new community that is to be resolved with respect to any prior communities (e.g., from a prior time window). The term "stable community" may refer to a community that has already been resolved and is stored in a database (e.g., from a prior time window). Rather than automatically create new communities, the new candidate communities are resolved with stable communities. Such reconciliation may provide for more concise user-community relationships and the ability to detect malicious use using these relationships.

The communities formed may act as context for detecting anomalous user behavior. The formation and/or resolution of communities may assist in identifying a set of users who are homogeneous with respect to overall changes in the collective activity of entities over the time.

Figure 4:
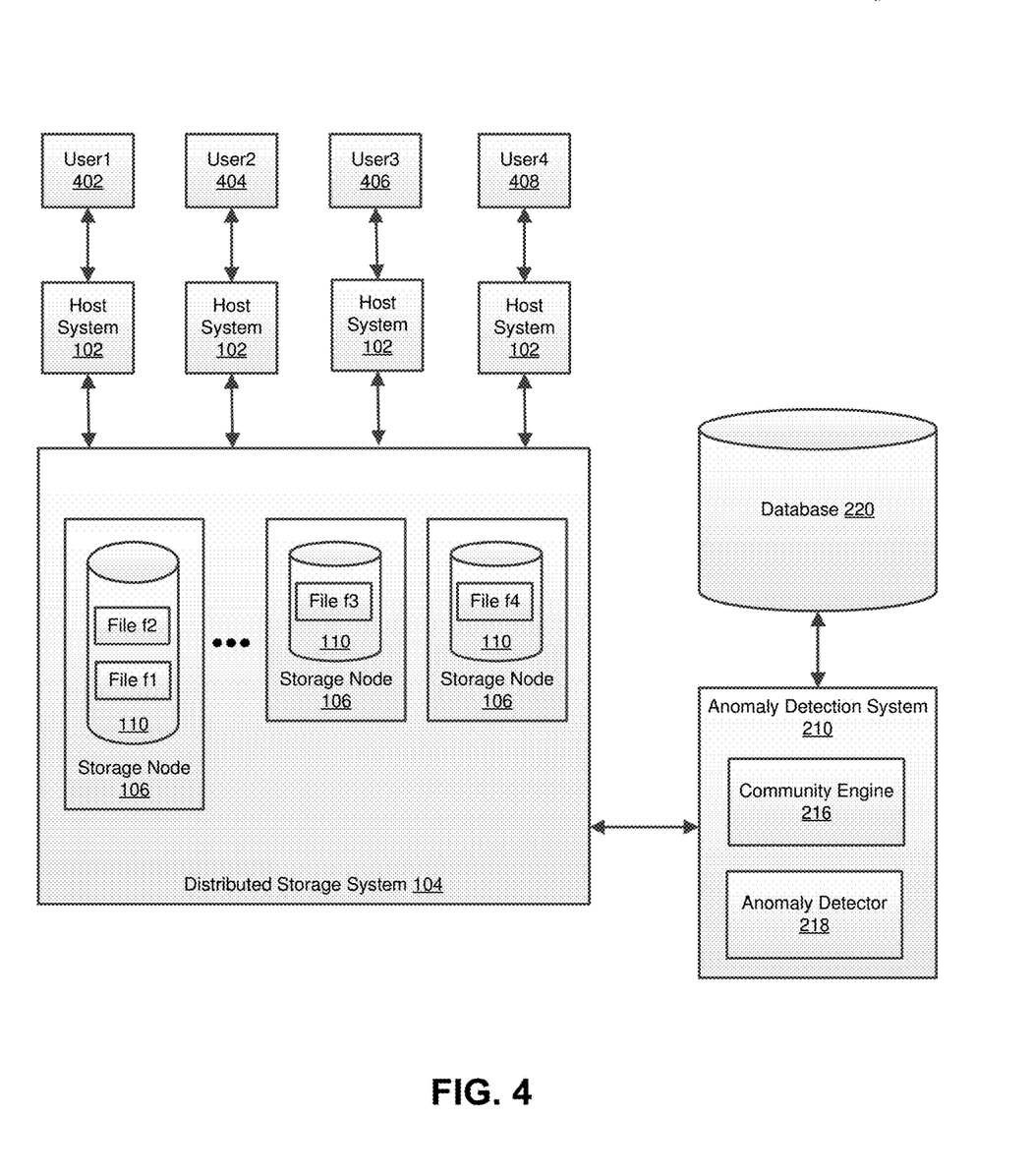
FIG. 4 is a schematic diagram of a computing architecture for accessing a set of entities according to aspects of the present disclosure.

Referring to FIG. 4, each of a User1 402, a User2 404, a User3 406, and a User4 408 may use a host system 102 to access files stored in the distributed storage system 104. By way of example, the files f1 and f2 are stored in the same storage device 110, the file f3 is stored in a storage device 110, and the file f4 is stored in a storage device 110. A user may use a host machine system 102 to read, write, and/or modify data in a file stored in a storage device 110. Additionally, the anomaly detection system 210 may communicate with the storage nodes 106 to obtain information regarding users' access patterns 222. As will be explained in more detail below, the anomaly detection system 210 may store information regarding users' access patterns 222 into the database 220 and later retrieve information (e.g., access patterns 222 and/or metrics 224) from the database 220.

Referring back to FIG. 2, the anomaly detector 218 may perform anomaly detection on different types of access rate metrics. For example, at a community level, the anomaly detector 218 may detect abnormal entity access rates by users included in a community. At a user level, the anomaly detector 218 may detect abnormal activity and data access rates by users belonging to the community for the entities common to the user in the community. If an entity accessed is not part of a community, the anomaly detector 218 may separately track access of entities by use. For example, the anomaly detector 218 may detect abnormal activity and entity access rates for entities that are specific to users (i.e., a user in a given community may additionally access one or more entities that are not expressly identified as corresponding to the given community, yet are still tracked according to embodiments of the present disclosure). Regarding entities specific to a user instead of the community, this type of detection may not include the community baseline or normalization also discussed in the present disclosure.

In an example, the anomaly detector 218 may execute in the cloud and may model multi-model distributions of the access rates. Additionally, the anomaly detector 218 may reward both low false negatives (cases where an actual anomaly is undetected) and low false positives (false alarms). The anomaly detector 218 may be computationally efficient to generate anomalies near real-time.

In some examples, the anomaly detector 218 detects anomalies based on communities and access to entities by users included in the communities. The anomaly detector 218 may use communities as a baseline to normalize user access behaviors based on activity of other users belonging to the same community. Relative changes may vary between users, as each user may have varying rates of access. Users of a community typically act similarly in terms of access patterns over time. If the access rate of a user increases in a community, all users in the community may be expected to show similar behavior at least in the direction of change (e.g., increasing or decreasing). The anomaly detector 218 may identify deviations from this assumption.

For each user in a community, the anomaly detector 218 may compute an access rate, which may be the total number of entities accessed in each time period by the user. For example (and by way of illustration), the anomaly detector 218 may maintain access patterns 222, which show that User1 of community 202 accessed the files f1 and f2 seven times, User2 of community 202 accessed the file f1 two times, User3 of community 202 accessed the file f1 five times, and User3 of community 204 accessed the file f3 one time, all during a given period of time. For files of a user who is not part of any community, the community may be treated as null. For example, access patterns 222 show that the User4, who is not part of a community, is associated with NoCommunity and has accessed the file f4 five times during the period of time.

The anomaly detector 218 may generate, based on the access patterns 222, the metrics 224. In some examples, the anomaly detector 218 may normalize the user access rates and overall community access rates by a percentile (e.g., using the median number of access rates) of all user access rates in the community. Continuing with the example from FIG. 2, Users {User1, User2, User 3} belong to community 202 and the median access rate value for the community is five (five being the median number of access rates for the community 202 during the period of time). The anomaly detector 218 may obtain metrics 224 (e.g., normalized metrics) for the users, including for example those belonging to community 202 (as well as community 204 and User4 without community, per the illustration) by dividing the user's individual access rate by the median access rate value. For example, as shown in the metrics 224 for community 202, the normalized metric for User1 is 7/5, for User2 is 2/5, and for User3 is 5/5. As another example, for community 204, the normalized metric for User3 is 1/1.

Accordingly, if the behavior of multiple of the users in the community changes in the same direction, dividing each user's individual access rate by the median access rate value "shifts" the access pattern and the individual user's changed (increased or decreased, as the case may be) access rate may not be as noticeable. In this example, the anomaly detector 218 does not flag the user's activity as suspicious if other users in the community behave in a similar way as the user (e.g., increase or decrease in access of a set of entities). It should be understood that the anomaly detector 218 may detect anomalies if a user's access rate changes and is not proportionately reflected in the behavior of other users in the same community. In this example, the user's behavior may deviate from the behavior of other users in the same community.

In an example, the anomaly detector 218 may determine a mean or median value for the number of times users in the same community access a set of files. If a user in the community accesses one or more files of the set of files over a threshold number of times over the mean or median (e.g., a percent deviation from the mean or median), the anomaly detector 218 may flag the user's behavior as suspicious. In another example, the anomaly detector 218 calculates a standard deviation for users' entity access patterns. The lower the standard deviation, the closer the users' behaviors are in terms of entity access patterns. Conversely, the higher the standard deviation, the more sporadic the users' behaviors are in terms of entity access patterns. If the anomaly detector 218 detects a standard deviation above a threshold, the anomaly detector 218 may review the users' access patterns to identify those users exhibiting suspicious behavior.

For users such as User4 who do not belong to a community, the anomaly detector 218 may refrain from normalizing the access rates of such users. As shown in the metrics 224 for User4, the metric is 5, its original user access rate. Thus, for users that do not belong to a community, the metric is compared against the user's past access rate for that particular entity.

In some examples, an algorithm, for example an entropy function, may modify a version of the anomaly detector. The algorithm may perform quantization of metrics compared to metrics computed in the cloud ranging from 0 to a finite value. Additionally, the algorithm may take as input an estimation of the upper limit, catering to a dynamic estimation of an upper limit.

The anomaly detector 218 may detect other anomalies based on communities aside from entity accesses. In some examples, the anomaly detector 218 may detect community-size anomalies. Each community formed may be resolved as an existing community or a new community. For each existing community post-resolution (that is, after resolving a newly generated community from a new time against existing communities from one or more prior times), the anomaly detector 218 may compute a current user count, which may be a total number of active users after resolution. The anomaly detector 218 may retrieve the previous immediate historical snapshot of the community from the database 220, where the snapshot is associated with a timestamp that is less than the timestamp of the latest run (i.e., is older than the timestamp of the latest run). The anomaly detector 218 may compute a previous user count, which may be the number of active users corresponding to the retrieved immediate historical snapshot of the community. Additionally, the anomaly detector 218 may apply the following equation when analyzing communities for anomalies:

$$communitySizeChange=((curr\_user\_count-prev\_user\_count)*100)/prev\_user\_count,$$

where the "communitySizeChange" is the change in the community size, the "curr_user_count" is the current user count, and the "prev_user_count" is the previous user count. The anomaly detector 218 may compare the "communitySizeChange" with a size threshold. If the "communitySizeChange" is greater than the size threshold (e.g., 200%), the anomaly detector 218 may flag the community size as an anomaly.

In some examples, after the communities are resolved, the anomaly detector 218 may also or alternatively detect user membership anomalies. For each user, the anomaly detector 218 may compute a current user membership count, which may be a total number of communities for a latest timestamp post-resolution. Additionally, the anomaly detector 218 may compute a previous user membership count, which may be a total number of communities corresponding to an immediate historical snapshot of the user membership from the database 220, where the snapshot is associated with a timestamp that is less than the timestamp of the latest run (i.e., is older than the timestamp of the latest run).

Additionally, the anomaly detector 218 may apply the following equation when analyzing for membership anomalies:

$$uMembChg=((curr\_user\_memb\_ct-prev\_user\_memb\_ct)*100)/prev\_user\_memb\_ct,$$

where the "uMembChg" is the change in user membership, the "curr_user_memb_ct" is the current user membership count, and the "prev_user_memb_ct" is the previous user membership count. The anomaly detector 218 may compare the "uMembChg" with a size threshold. If the uMembChg" is greater than the size threshold (e.g., 200%), the anomaly detector 218 may flag the user membership as an anomaly.

Accordingly, the above has described several different scenarios in which an anomaly may be flagged based on users in communities accessing common entities. While described separately, according to embodiments of the present disclosure different combinations of anomalies, including all of them, may be flagged where the conditions warrant such. In additional, in some embodiments of the present disclosure a combination of anomalies may be met as a precondition to flag an anomaly.

Figure 3:
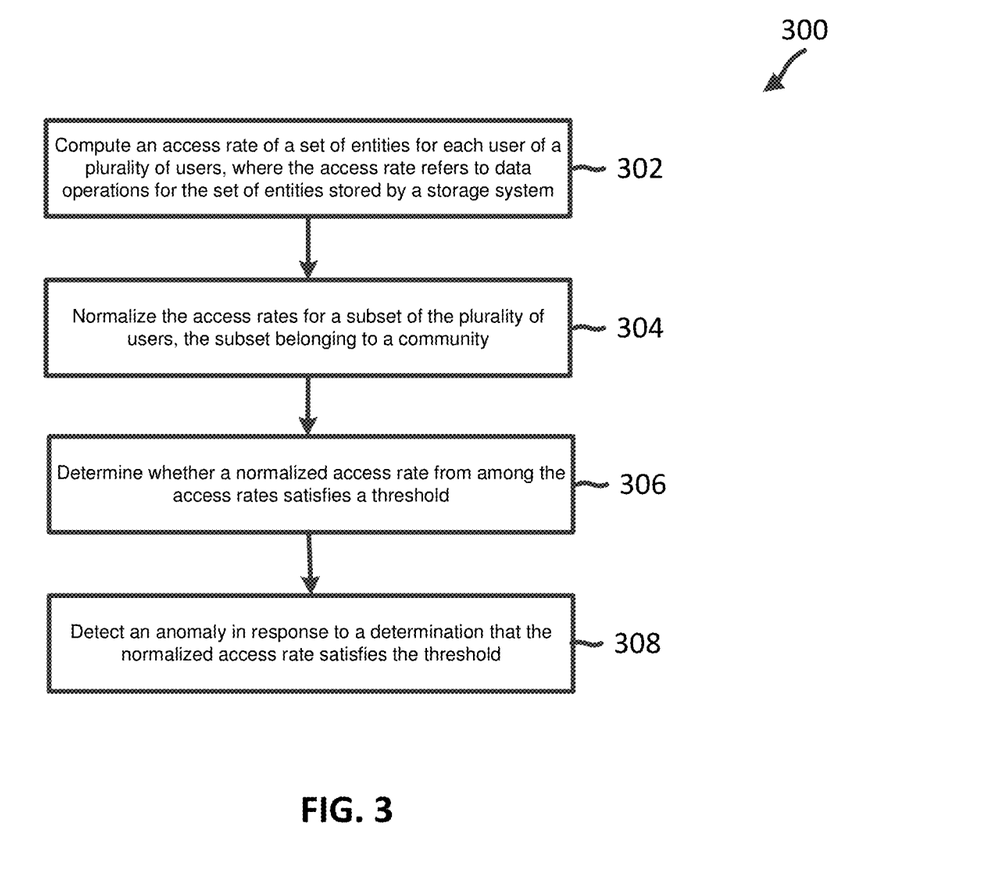
FIG. 3 is a flow diagram of a method of detecting anomalies according to aspects of the present disclosure.

FIG. 3 is a flow diagram of a method 300 of detecting anomalies according to aspects of the present disclosure. Steps of the method 300 can be executed by a computing device (e.g., a processor, processing circuit, and/or other suitable component) or other suitable means for performing the steps. For example, the community detection system 210 may utilize one or more components to execute the steps of method 300. As illustrated, the method 300 includes a number of enumerated steps, but embodiments of the method 300 may include additional steps before, after, and in between the enumerated steps. In some embodiments, one or more of the enumerated steps may be omitted or performed in a different order.

Referring to block 302 of FIG. 3, the community detection system 210 (e.g., via the anomaly detector 218) may compute an access rate of a set of entities for each user of a plurality of users, where the access rate refers to data operations for the set of entities stored by a storage system. In some examples, the access rates may be based on a sliding time period. For example, the sliding time period in which anomalies are checked for may be on the order of minutes, such as one minute, or on the order of seconds, etc., so that the system may operate at real-time or near real-time.

Referring to block 304 of FIG. 3, the community detection system 210 (e.g., via the anomaly detector 218) may normalize the access rates for a subset of the plurality of users, the subset belonging to a community. In an example, the plurality of users may include a first subset that is part of a community and a second subset that is not part of any community. In another example, each user of the plurality of users is part of the community. The community may be based on a common set of attributes shared by the first subset of users. The anomaly detector 218 may normalize the access rates by dividing a user's access rate by a total access rate of the community. This may be done separately for every community identified from block 302.

Referring to block 306 of FIG. 3, the community detection system 210 (e.g., via the anomaly detector 218) may determine whether a normalized access rate from among the access rates satisfies a threshold.

Referring to block 308 of FIG. 3, the community detection system 210 (e.g., via the anomaly detector 218) may detect an anomaly in response to a determination that the normalized access rate satisfies the threshold (e.g., the normalized access rate is at least one). Conversely, the community detection system 210 (e.g., via the anomaly detector 218) does not detect an anomaly in response to a determination that the normalized access rate does not satisfy the threshold (e.g., the normalized access rate is less than one). With respect to the users in a second subset not identified as part of a community, the anomaly detector 218 may detect an anomaly in response to a determination that access rates for the second subset satisfies a second threshold (where the second and first thresholds may be different from each other, or similar).

Additionally, although a threshold scheme may be discussed in some examples, it should be understood that other examples that detect an anomaly based on normalized access rates are within the scope of the disclosure. For example, the normalized access rate time series may be run through a relative entropy anomaly detection formula that flags anomalies. In this example, if the formula returns a score of zero, the anomaly detector 218 does not detect an anomaly. Conversely, if the formula returns a score of one, the anomaly detector 218 may detect an anomaly.

In some further or alternative examples, the anomaly detector 218 determines that a size of the community is an anomaly based on a total number of active users after resolution of the community and based on a number of active users of an immediate historical snapshot of the community. In some further or alternative examples, the anomaly detector 218 determines that a user membership of the community is an anomaly based on a first total number of communities after resolution of the community and based on a second total number of communities of an immediate historical snapshot of the community. The anomaly detector 218 may identify any of these anomalies separately, focus on some subset of anomalies to detect based on application, and/or use a combination of the above to detect an anomaly.

If an anomaly is detected, the community resolution engine 218 may transmit a message to an administrator of the data with information about the detected anomaly (e.g., the flagged suspicious behavior). In an example, the administrator may receive the message and be informed of suspicious behavior exhibited by one or more users in relation to entity access patterns. For example, the administrator may review a user's entity access pattern that has been flagged as suspicious and determine that the user should not have access to the entity. In this example, the administrator may block the user from accessing the entity. Additionally, or alternatively, the community resolution engine 218 may perform an action without user authorization. For example, the community resolution engine 218 may block the user from accessing an entity until the access has been reviewed and approved by an administrator.

FIG. 4 is a schematic diagram of a computing architecture for accessing a set of entities according to aspects of the present disclosure. In FIG. 4, four host systems 102 may communicate with the distributed storage system 104 to read, write, and/or modify data. Each of the host systems 102 may represent a user account of the User1 402, User2 404, User3 406, or User4 408, as shown in FIG. 2. For example, a host system 102 may represent a user account of User1 402, who accesses Files {f1 and f2}, a host system 102 may represent a user account of User2 404, who accesses Files {f1 and f2}, a host system 102 may represent a user account of User3 406, who accesses Files {f1, f2, and f3}, and a host system 102 may represent a user account of User4 408, who does not access any files of Files {f1, f2, and f3}.

Although the disclosure may provide examples of file accesses for anomaly detection (e.g., file access rate), it should be understood that other and/or additional file operations (e.g., file deletion, file modification, etc.) are within the scope of the disclosure.

The present embodiments can take the form of an entirely hardware embodiment, an entirely software embodiment, or an embodiment containing both hardware and software elements. Accordingly, it is understood that any operation of the computing systems of computing architecture 100 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides a system, method, and machine-readable storage medium for detecting an anomaly based on a community. In some embodiments, the method includes computing, by a storage system, an access rate of a set of entities for each user of a plurality of users, where the access rate refers to data operations for the set of entities stored by the storage system; normalizing, by the storage system, the access rates for a subset of the plurality of users, the subset belonging to a community; determining, by the storage system, whether a normalized access rate satisfies a threshold; and detecting an anomaly in response to a determination that the normalized access rate satisfies the threshold.

In yet further embodiments, the non-transitory machine-readable medium has instructions for performing the method of detecting an anomaly based on a community, including machine executable code, which when executed by at least one machine, causes the machine to: compute, by a storage system, an access rate of a set of entities for each user of a plurality of users, where the access rate refers to data operations for the set of entities stored by the storage system; normalize, by the storage system, the access rates for a subset of the plurality of users, the subset belonging to a community; determine, by the storage system, whether a normalized access rate satisfies a threshold; and detect an anomaly in response to a determination that the normalized access rate satisfies the threshold.

In yet further embodiments, the computing device includes a memory containing a machine-readable medium comprising machine executable code having stored thereon instructions for performing a method of detecting an anomaly based on a community and a processor coupled to the memory. The processor is configured to execute the machine executable code to: compute, by a storage system, an access rate of a set of entities for each user of a plurality of users, where the access rate refers to data operations for the set of entities stored by the storage system; normalize, by the storage system, the access rates for a subset of the plurality of users, the subset belonging to a community; determine, by the storage system, whether a normalized access rate satisfies a threshold; and detect an anomaly in response to a determination that the normalized access rate satisfies the threshold.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    computing, by a storage system, one or more access rates of a set of entities for each user of a plurality of users, wherein the one or more access rates refers to data operations for the set of entities stored by the storage system;
    normalizing, by the storage system, the one or more access rates of the first set of entities for a first subset of the plurality of users by dividing a respective user's access rate by a total access rate of a community, the respective user being part of the first subset belonging to the community, and the one or more normalized access rates including a first normalized access rate for a first user of the first subset;
    determining, by the storage system, that the first normalized access rate satisfies a threshold;
    detecting, by the storage system, a first anomaly in response to determining that the first normalized access rate satisfies the threshold;
    detecting, by the storage system, a second anomaly based on a total number of active users after resolution of the community in relation to a number of active users of a previous historical snapshot of the community; and
    restricting, by the storage system, access by the first user to the set of entities in response to detecting the first and second anomalies.

2. The method of claim 1, wherein the community is based on access to the set of entities by the first subset of the plurality of users.

3. The method of claim 1, wherein the second anomaly is based on a size of the community.

4. The method of claim 1, further comprising:
    determining, by the storage system, that a user membership of the community is a third anomaly based on a first total number of communities after resolution of the community in relation to a second total number of communities of the previous historical snapshot of the community.

5. The method of claim 1, further comprising:
    detecting, by the storage system, a third anomaly in response to access rates for a second subset of the plurality of users that satisfies a second threshold, wherein the second subset is not part of the community.

6. The method of claim 1, wherein the one or more access rates for the first subset are determined with respect to a sliding time period.

7. The method of claim 1, further comprising:
    transmitting a message to an administrator in response to detecting the first anomaly, the message specifying the first user's entity access patterns associated with the first anomaly.

8. A non-transitory machine-readable medium having stored thereon instructions for performing a method, comprising machine executable code which when executed by at least one machine, causes the machine to:
    compute, by a storage system, one or more access rates of a set of entities for each user of a plurality of users, wherein the one or more access rates refers to data operations for the set of entities stored by the storage system;
    normalize, by the storage system, the one or more access rates of the set of entities for a first subset of the plurality of users by dividing a respective user's access rate by a total access rate of a community, the respective user being part of the first subset belonging to the community, and the one or more normalized access rates including a first normalized access rate for a first user of the first subset;
    determine, by the storage system, that the first normalized access rate satisfies a threshold;
    detect, by the storage system, a first anomaly in response to the determination that the first normalized access rate satisfies the threshold;
    detect, by the storage system, a second anomaly based on a change in a size of the community; and
    restrict, by the storage system, access by the first user to the set of entities in response to detecting the first and second anomalies.

9. The non-transitory machine-readable medium of claim 8, wherein the community is based on access to the set of entities by the first subset of the plurality of users.

10. The non-transitory machine-readable medium of claim 8, wherein the second anomaly is based on a total number of active users after resolution of the community in relation to a number of active users of a previous historical snapshot of the community.

11. The non-transitory machine-readable medium of claim 8, further comprising machine executable code which causes the machine to:
    determine that a user membership of the community is a third anomaly based on a first total number of communities after resolution of the community in relation to a second total number of communities of a previous historical snapshot of the community.

12. The non-transitory machine-readable medium of claim 8, further comprising machine executable code which causes the machine to:

detect a third anomaly in response to access rates for a second subset of the plurality of users satisfies a second threshold, wherein the second subset is not part of any community.

13. The non-transitory machine-readable medium of claim 8, wherein the one or more access rates for the first subset are determined with respect to a sliding time period.

14. The non-transitory machine-readable medium of claim 8, wherein the first subset includes the plurality of users.

15. A computing device comprising:
a memory containing a machine-readable medium comprising machine executable code having stored thereon instructions for performing a method of forming communities; and
a processor coupled to the memory, the processor configured to execute the machine executable code to:
compute, by a storage system, one or more access rates of a set of entities for each user of a plurality of users, wherein the one or more access rates refers to data operations for the set of entities stored by the storage system;
normalize, by the storage system, the one or more access rates of the set of entities for a first subset of the plurality of users by dividing a respective user's access rate by a total rate of a community, the respective user being part of the first subset belonging to the community, and the one or more normalized access rates including a first normalized access rate for a first user of the first subset;
determine, by the storage system, that the first normalized access rate satisfies a first threshold;
detect, by the storage system, a first anomaly in response to the determination that the first normalized access rate satisfies the first threshold;
determine, by the storage system, that a change in a size of the community satisfies a second threshold;
detect, by the storage system, a second anomaly in response to the determination that the change satisfies the second threshold; and
restrict, by the storage system, access by the first user to the set of entities in response to detecting the first and second anomalies.

16. The computing device of claim 15, wherein the community is based on access to the set of entities by the first subset of the plurality of users.

17. The computing device of claim 15, wherein the one or more access rates for the first subset are determined with respect to a sliding time period.

18. The method of claim 5, further comprising:
restricting access by a second user of the second subset in response to detecting the third anomaly.

19. The non-transitory machine-readable medium of claim 12, further comprising machine executable code which causes the machine to:
restrict access by a second user of the second subset in response to detecting the third anomaly.

20. The computing device of claim 15, wherein the processor is configured to execute the machine executable code to:
detect a third anomaly in response to access rates for a second subset of the plurality of users satisfies a second threshold, wherein the second subset is not part of any community; and
restrict access by a second user of the second subset in response to detection of the third anomaly.

* * * * *